(12) United States Patent
Dawson et al.

(10) Patent No.: US 9,589,380 B2
(45) Date of Patent: Mar. 7, 2017

(54) AVATAR-BASED UNSOLICITED ADVERTISEMENTS IN A VIRTUAL UNIVERSE

(75) Inventors: Christopher J. Dawson, Arlington, VA (US); Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2245 days.

(21) Appl. No.: 11/679,449

(22) Filed: Feb. 27, 2007

(65) Prior Publication Data

US 2008/0204450 A1    Aug. 28, 2008

(51) Int. Cl.
G06Q 30/00    (2012.01)
G06T 13/00    (2011.01)
G06Q 30/02    (2012.01)

(52) U.S. Cl.
CPC ............. *G06T 13/00* (2013.01); *G06Q 30/02* (2013.01)

(58) Field of Classification Search
None
See application file for complete search history.

(56) References Cited

U.S. PATENT DOCUMENTS

| | | |
|---|---|---|
| 5,964,660 A | 10/1999 | James et al. |
| 6,023,270 A | 2/2000 | Brush et al. |
| 6,036,601 A | 3/2000 | Heckel |
| 6,119,101 A | 9/2000 | Peckover |
| 6,271,843 B1 | 8/2001 | Lection et al. |
| 6,338,066 B1 * | 1/2002 | Martin et al. .................. 707/10 |
| 6,954,728 B1 | 10/2005 | Kusumoto et al. |
| 6,968,315 B1 | 11/2005 | Nakisa |
| 6,981,220 B2 | 12/2005 | Matsuda |
| 6,988,127 B2 | 1/2006 | Matsuda et al. |
| 7,139,796 B2 | 11/2006 | Rekimoto et al. |
| 2001/0018667 A1 | 8/2001 | Kim |
| 2002/0093538 A1 | 7/2002 | Carlin |
| 2002/0094189 A1 | 7/2002 | Navab et al. |
| 2003/0177187 A1 * | 9/2003 | Levine et al. ................ 709/205 |
| 2004/0248649 A1 | 12/2004 | Arai et al. |
| 2005/0037846 A1 | 2/2005 | Anokhin |

(Continued)

OTHER PUBLICATIONS

Richard Siklos, "A Virtual World but Real Money", Article Tools Sponsored by Dench Blanchett, Notes on Scandal, Published: Oct. 19, 2006.

(Continued)

*Primary Examiner* — Daniel Sorkowitz
(74) *Attorney, Agent, or Firm* — Lisa Ulrich; Hoffman Warnick LLC

(57) ABSTRACT

A system, method and program product for providing a virtual universe in which unsolicited advertisements are embodied in automated avatars. A system is provided that includes: a registration system for introducing an advertisement avatar into the virtual universe; a targeting system for targeting a user avatar for delivery of advertising content by the advertisement avatar; a movement system for defining how the advertisement avatar is to move within the virtual universe; and an advertisement delivery system for defining how the advertisement avatar is to deliver the advertising content to the user avatar.

30 Claims, 2 Drawing Sheets

(56) References Cited

U.S. PATENT DOCUMENTS

| | | |
|---|---|---|
| 2005/0216346 A1* | 9/2005 | Kusumoto et al. ............. 705/14 |
| 2006/0111979 A1* | 5/2006 | Chu ............................... 705/14 |
| 2006/0130095 A1 | 6/2006 | Willis et al. |
| 2006/0135232 A1 | 6/2006 | Willis |
| 2006/0155597 A1 | 7/2006 | Gleason |
| 2006/0229976 A1 | 10/2006 | Jung et al. |
| 2007/0038559 A1 | 2/2007 | Jung et al. |
| 2007/0179867 A1* | 8/2007 | Glazer et al. ................... 705/27 |
| 2008/0070690 A1* | 3/2008 | Van Luchene et al. ........ 463/42 |

OTHER PUBLICATIONS

Jeremy Lockhorn, "Virtual Advertising in a Virtual World", Email-Labs, High-Performance Email Marketing Technology, Jun. 19, 2006, pp. 1-2, http://www.clickz.com/showPage.html?page=clickz_print&id=3613746.

* cited by examiner

AVATAR-BASED UNSOLICITED ADVERTISEMENTS IN A VIRTUAL UNIVERSE

FIELD OF THE INVENTION

The present invention relates to virtual advertising, and more specifically relates to a virtual universe in which unsolicited advertisements are embodied in automated avatars.

BACKGROUND OF THE INVENTION

Virtual universes represent a technological forefront and present a tremendous new outlet for both structured and unstructured virtual collaboration, virtual gaming and exploration, and real-life simulation in virtual universe spaces. A virtual universe is an interactive simulated environment accessed by multiple users through an online interface. Users inhabit and interact in the virtual environment via avatars. This habitation usually is represented in the form of two or three-dimensional graphical representations of humanoids (or other graphical or text-based avatars). There are many different types of virtual environments, however there are several features most virtual environments have in common:
A) Shared Space: the world allows many users to participate at once.
B) Graphical User Interface: the environment depicts space visually, ranging in style from 2D "cartoon" imagery to more immersive 3D environments.
C) Immediacy: interaction takes place in real time.
D) Interactivity: the environment allows users to alter, develop, build, or submit customized content.
E) Persistence: the environment's existence continues regardless of whether individual users are logged in.
F) Socialization/Community: the environment allows and encourages the formation of social groups such as teams, guilds, clubs, cliques, housemates, neighborhoods, etc.

SECOND LIFE®, which is a registered trademark of Linden Lab, is an example of a virtual universe in which avatars are provided with tools to view, navigate, and modify the virtual universe space and participate in its virtual activities. These virtual activities, along with various yet to be created new dimensions, provide a wide open arena for creative and new advertising methods and mechanisms.

SUMMARY OF THE INVENTION

The present invention relates to a virtual universe in which unsolicited advertisements are embodied in automated avatars. In a first aspect, the invention provides a system for delivering advertisements to user avatars in a virtual universe, comprising: a registration system for introducing an advertisement avatar into the virtual universe; a targeting system for targeting a user avatar for delivery of advertising content by the advertisement avatar; a movement system for defining how the advertisement avatar is to move within the virtual universe; and an advertisement delivery system for defining how the advertisement avatar is to deliver the advertising content to the user avatar.

In a second aspect, the invention provides a computer program product stored on a computer readable medium for delivering advertisements to user avatars in a virtual universe, comprising: program code for introducing an advertisement avatar into the virtual universe; program code for targeting a user avatar for delivery of advertising content by the advertisement avatar; program code for defining how the advertisement avatar is to move within the virtual universe; and program code for defining how the advertisement avatar is to deliver the advertising content to the user avatar.

In a third aspect, the invention provides a method for delivering advertisements to user avatars in a virtual universe, comprising: registering an advertisement avatar into the virtual universe; targeting a user avatar for delivery of advertising content by the advertisement avatar; moving the advertisement avatar within the virtual universe proximate the user avatar; and delivering the advertising content to the user avatar.

In a fourth aspect, the invention provides a method for deploying a system for delivering advertisements to user avatars in a virtual universe, comprising: providing a computer infrastructure being operable to: register an advertisement avatar into the virtual universe; target a user avatar for delivery of advertising content by the advertisement avatar; define how the advertisement avatar is to move within the virtual universe; and define how the advertisement avatar is to deliver the advertising content to the user avatar.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
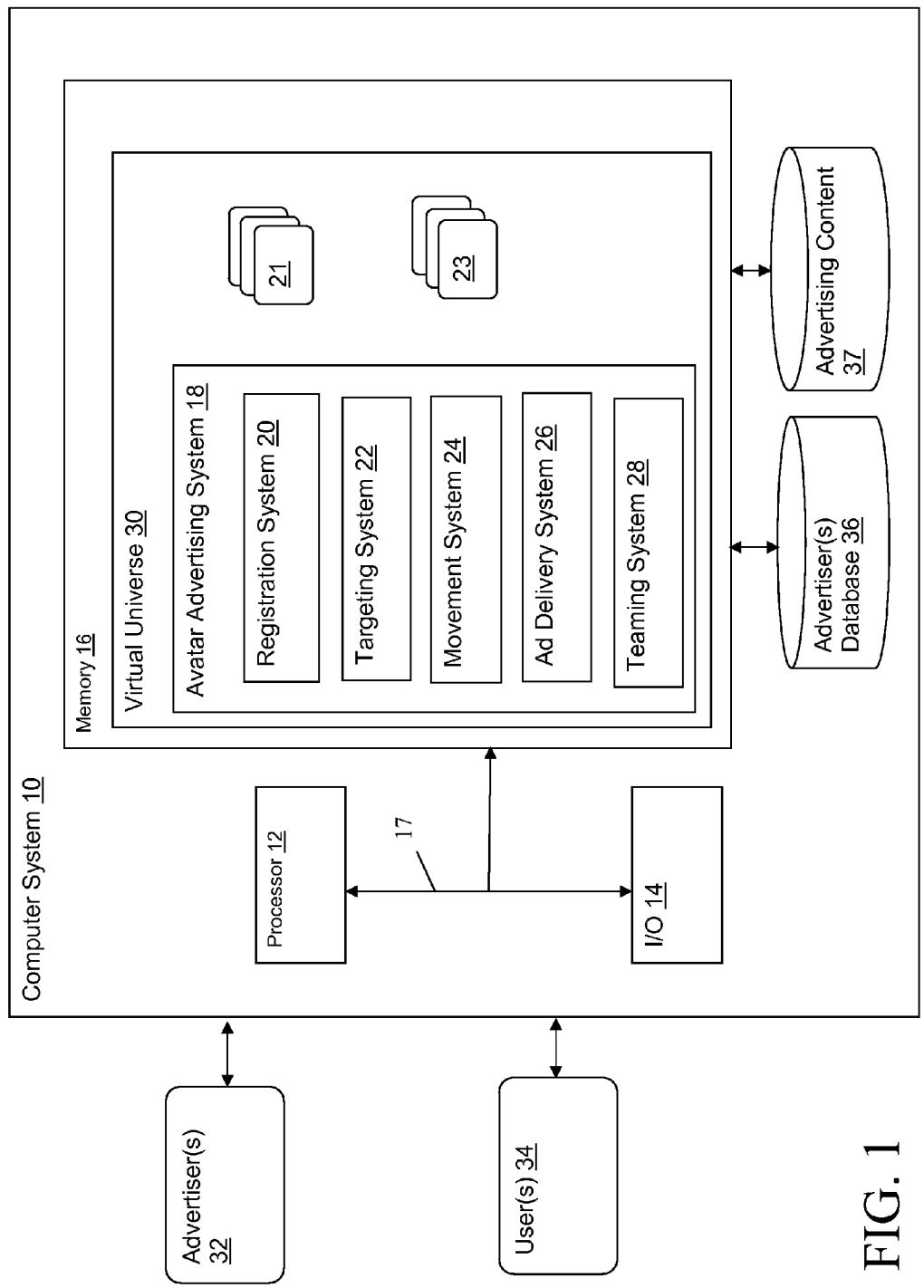
FIG. 1 depicts a computer system having an avatar advertising system in a virtual universe in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Referring to FIG. 1, a computer system 10 is shown that includes a system (e.g., a software program) for implementing a virtual universe 30. In an illustrative embodiment, virtual universe 30 may be implemented by one or more servers, which can be accessed by users 34 over a network, such as the Internet. Specific details regarding how a virtual universe 30 is implemented are known in the art, and are therefore not provided herein. In such an environment, users 34 may participate in the virtual universe 30 as avatars via a client program (not shown) such as a program that supplies a graphical interface. As noted above, the term "avatar" refers to a virtual representation of a user 34 participating in the virtual universe 30.

Integrated with virtual universe 30 is an avatar advertising system 18 that provides a mechanism for providing automated avatars capable of delivering advertising content to user-based avatars participating in the virtual universe 30. For the purposes of this disclosure, the term "user avatar" 21 refers to an avatar controlled by a user 34, while the term "advertisement avatar" 23 refers to an automated avatar that is controlled by an advertiser 32. Details regarding the interaction between user avatars 21 and advertisement avatars 23 are provided below.

In the illustrative embodiment shown in FIG. 1, avatar advertising system 18 includes: a registration system 20 for introducing a new advertisement avatar 23 into the virtual universe 30; a targeting system 22 for targeting user avatars 21 for delivery of advertising content 37 by an advertisement avatar 23; a movement system 24 for defining how each advertisement avatar 23 is to move within the virtual universe 30; an advertisement ("ad") delivery system 26 for defining how each advertisement avatar 23 is to deliver advertising content 37 to the user avatars 21; and a teaming system 28 for causing a plurality of advertisement avatars 23 in the virtual universe 30 to deliver advertising content 37 to one or more user avatars 21 in a coordinated manner.

Registration system 20 provides a mechanism through which virtual universe 18 may provide or sell user accounts to advertisers 32, including the ability to register one or more advertisement avatars 23. During the registration process (or at a later point), the advertiser 32 can implement or select desired scripts or an integrated program containing instructions for the actions of the advertisement avatar 23 being registered. Once registered, an advertisement avatar 23 is free to navigate within the virtual universe 30 in accordance with a set of properties as defined by scripts or programs.

As noted, targeting system 22 is used to identify a user avatar 21 to advertise to. Because advertising is often known in the field of advertising to result in sub-optimal sales, automated targeting is herein provided. Targeting can be based on any known methodologies to determine potential affinity with an advertiser's product or service. For instance demographics of the user 34 associated with the user avatar 21 may be utilized. Other techniques include, but are not limited to, location-based, event-based, gender-based, age-based, keyword-based, inventory-based, and appearance-based targeting. Some targeting may be conducted by querying information remotely, such as a list of currently appearing avatars and their locations in the virtual universe 30, a published list of assets, a map showing where user avatars 21 currently are, a listing of events where avatars are likely to be gathering, etc. Some targeting may be conducted by traversing a region and approaching user avatars 31 that are encountered. Determining the existence of a user avatar 21 may for instance be technically enabled by the appearance of the rendering of another user avatar 21, which is kept distinct by the user avatar's UUID (i.e., a unique identifier).

Targeting can be cancelled if a user avatar 21 does not respond as desired, e.g., ignoring the advertisement avatar 23, undesirably interacting with the advertisement avatar 23 (such as what might be construed as abuse by a human), expressing a desire for the conversation to end, walking away from the advertisement avatar 23, or failing to respond according to the advertisement avatar's programmed requirements (such as by not clicking as instructed within 30 seconds). Cancellation techniques such as these can be used to prevent the advertisement avatar 23 from becoming a nuisance and also allow the advertisement avatar 23 to focus on user avatars 21 who are more likely to result in a sale.

Historical and ongoing interactions with user avatars 33 may be stored in an advertiser's database 36, which can then be used to determine, e.g., (a) if a user avatar 21 has already been targeted, (b) when the user avatar 21 should be targeted again, (c) how the user avatar 21 should be targeted in the future (such as via a coordinated teaming approach, by sending a different advertisement avatar 23, by dynamically altering the "personality" and delivery of the advertisement avatar 23), etc.

Movement system 24 controls the movement of the advertisement avatars 23, e.g., using movement control scripts. Scripted movements may, for example, include walking, running, and teleporting to user avatars 21 in order to initiate an advertisement. Other type of movements may include responding to a user avatar 21. Such responses may include programmed "body language" to appear more personable or increase the chances of interest. This may be technically enabled by parsing text or audio spoken to the advertisement avatar 23 or parsing movement of user avatars 21, such as detecting if a user avatar 21 is in a predefined posture or making a predefined gesture of, e.g., shaking hands, waving, winking, smiling, frowning, crossing arms, etc.

Other types of movements may involve following a user avatar 21 to enable the advertisement avatar 23 to continue advertising while the user avatar 23 is walking, leaving a user avatar 21 if the user avatar 21 communicates a desire for the conversation to end, etc.

Ad delivery system 26 determines how the advertising content 37 is actually going to be delivered to a targeted user avatar 21. Advertisement avatars 23 may be equipped with chat or speech control scripts to deliver ad content or engage a user avatar 21. For example, an advertisement avatar 23 may deliver via text or audio an initial message such as, "Click me to hear how Product X can revolutionize your diet and help you sleep," or "Want to see my web cam?" In other cases, advertisement avatars 23 may be equipped to interactively respond to questions and answers (e.g., internally searching a knowledge base, responsive to commands to display a list of products or services, responsive to questions that are frequently asked including shipping rates, tax, return policies, etc.).

In addition, advertising avatars 23 may be equipped with asset scripts to, e.g., display video or give samples (such as digital representations of real world items). These may also be associated with movement scripts, such as the advertisement avatar's arms and hands being used to pull out such a sample from their pocket or a bag.

As noted, teaming system 28 allows for coordinating a plurality of advertisement avatars 23 to deliver advertising content 37 to one or more user avatars 21. A plurality of advertisement avatars 23 may advertise to a user avatar 21 synchronously or asynchronously. This provides the option for different sales personalities and tactics. The use of multiple advertisement avatars 23 may be scripted based on input from the targeting system 22 and/or by the outcome of the ad delivery system 26.

The use of teaming may be the default approach: (a) synchronously upon failure of a previous advertisement avatar 23 to result in a sale, or (b) asynchronously upon the next scheduled visit (that is, by sending a different advertisement avatar). The use of teaming may also be based on calculating probabilities of success from factors determined in the ad delivery system 26 or from what is known about the preferences of a user avatar 21, matched to a database of behaviors. For example, it may be discovered that teaming results in higher sales when a series of advertisement avatars 23 each interact with the user avatar 21 for a short period of time.

Figure 2:
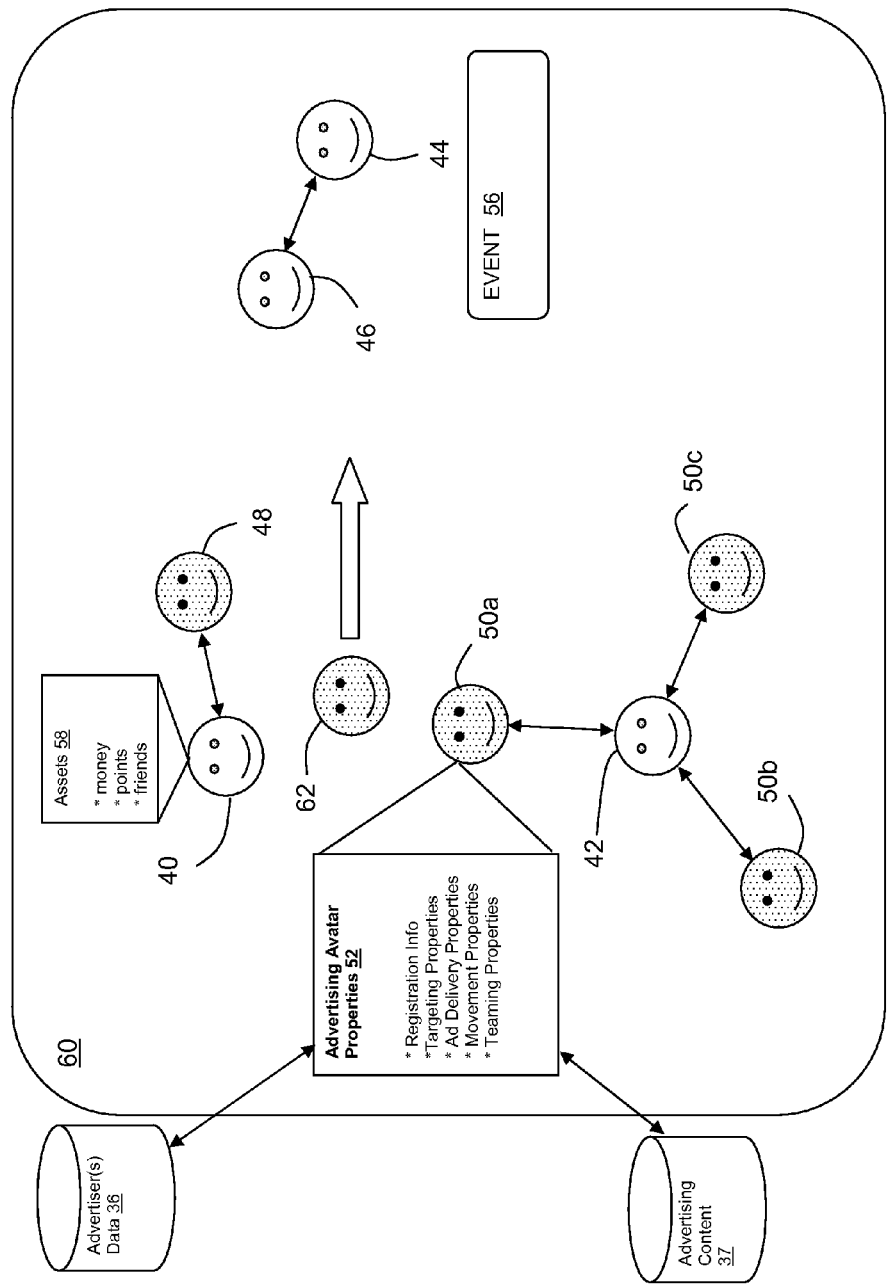
FIG. 2 depicts a virtual universe in accordance with an embodiment of the present invention.

FIG. 2 depicts a simplified graphical view of a virtual universe 60 showing illustrative interactions of avatars in accordance with some of the features described above. As shown, virtual universe 60 includes a plurality of user avatars 40, 42, 44; and advertisement avatars 48, 50*a*, 50*b*, 50*c*, 62.

In one scenario, advertisement avatar 48 has engaged user avatar 40. For the purposes of explanation, it can be seen that user avatar 40 includes various assets 58, such as money, points and friends. Although not shown, each such user avatar would include a set of assets. These assets 58 are the basis for targeting by advertisement avatar 48.

In another scenario, user avatars 44 and 46 are engaged with each other while attending event 56. Event 56 may be any type of occurrence, location or happening, such as a video stream, store opening, music download, etc., that is of interest to user avatars 44 and 46. Based on the attendance and/or occurrence of event 56, advertisement avatar 62 is automatically directed to move towards event 56 to look for potential targets.

In a further scenario, advertisement avatars 50*a*, 50*b*, and 50*c* are using a teaming approach to engage user avatar 42. For the purposes of explanation, it can be seen that advertisement avatar 50*a* includes a set of properties, which includes registration information, targeting properties (what criteria is to be used to target user avatars), ad delivery properties (how ad content is to be delivered), movement properties (how advertisement avatar 50*a* moves within universe 60) and teaming properties (how advertisement avatar 50*a* coordinates with other advertisement avatars). Although not shown, each such advertisement avatar would include a set of properties.

Obviously the scenarios shown in FIG. 2 are for illustrative purposes only, and many other scenarios and embodiments are contemplated. Some of the general features of avatar advertising system 18 (FIG. 1) include the ability to: create and introduce advertisement avatars 23 that can recognize user avatars 21 in a virtual universe 30 (e.g., differentiating user avatars 21 from trees, buildings, and other virtual structures) and approach/engage a user avatar 21. Engaging user avatars 21 may be done, e.g., in undifferentiated terms; based on whether the particular user avatar 21 appears to be active (talking, moving, etc.) or other specifics of body language; based on whether the particular user avatar 21 has been approached recently; based on whether the particular user avatar 21 has reacted positively to advertising before, etc. Once approached, the advertisement avatar 23 can deliver advertising content 27 to the targeted user avatar 21, follow or walk away from the targeted user avatar 21 based on a variety of circumstances, or take other actions. Additionally, teaming may be utilized by a plurality of advertisement avatars 23 to deliver advertising content in a coordinated manner.

In general, computer system 10 may be implemented as any type of computing infrastructure using any type of computing devices. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising a virtual universe 30 having an avatar advertising system 18 could be created, maintained and/or deployed by a service provider that offers the functions described herein for customers. That is, a service provider could offer to provide the ability to create and control advertisement avatars as described above.

It is understood that in addition to being implemented as a system and method, the features may be provided as a program product stored on a computer-readable medium, which when executed, enables computer system 10 to provide a virtual universe 30 that includes an avatar advertising system 18. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 16 and/or a storage system, and/or as a data signal traveling over a network (e.g., during a wired/wireless electronic distribution of the program product).

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A computer system for delivering advertisements to user avatars in a virtual universe, the computer system comprising:
    at least one processing unit;
    memory operably associated with the at least one processing unit;
    an avatar advertising system storable in memory and executable by the at least one processing unit, the avatar advertising system comprising:
        a targeting system for targeting a user avatar for delivery of advertising content by an advertisement avatar, wherein the targeting system permits the user avatar to cancel the targeting of the user avatar with delivery of future advertising content in response to the user avatar expressing a desire that discourages further delivery of advertising content;
        a movement system for defining how the advertisement avatar is to move within the virtual universe;
        an advertisement delivery system for defining how the advertisement avatar is to deliver the advertising content to the user avatar; and
        a teaming system for introducing a plurality of advertisement avatars into the virtual universe to deliver advertising content to the user avatar in a coordinated manner, wherein use of the plurality of advertisement avatars to deliver advertising content to the user avatar is based on calculating a probability of success that the use of the plurality of advertisement avatars will have in generating a sale with the user avatar, wherein the calculating of the probability of success that the use of the plurality of advertisement avatars will have in generating a sale with the user avatar is based on matching preferences of the user avatar with a database of behaviors, wherein the teaming system causes the user avatar to be approached by the plurality of advertisement avatars in a synchronous manner or an asynchronous manner in response to determining that the probability of success is favorable, wherein in the synchronous manner the plurality of advertisement avatars approach the user avatar at the same time, while in the asynchronous manner the plurality of advertisement avatars approach the user avatar at different times, and wherein the synchronous manner is initiated upon failure of a previous advertisement avatar to obtain a sale and the asynchronous manner is initiated at scheduled visits.

2. The system of claim 1, wherein the advertising content is delivered by the advertising avatar to the user avatar via a text or audio message.

3. The system of claim 1, wherein the advertising content is delivered by the advertising avatar to the user avatar via an interactive question and answer session.

4. The system of claim 1, wherein the user avatar is targeted based on demographic data of a user controlling the user avatar.

5. The system of claim 1, wherein the user avatar is targeted based on a location of the user avatar in the virtual universe.

6. The system of claim 1, wherein the user avatar is targeted based on an asset associated with the user avatar.

7. The system of claim 1, wherein the user avatar is targeted based on an occurrence of an event in the virtual universe.

8. The system of claim 1, wherein the movement system includes providing a movement selected from the group consisting of: walking, running, teleporting, altering body language, following a user avatar, and leave a user avatar.

9. The system of claim 1, wherein the movement system includes a system for parsing actions of the user avatar, wherein the actions of the user avatar include postures and gestures.

10. The system of claim 1, further comprising a registration system for introducing the advertisement avatar into the virtual universe.

11. A computer program product stored on a computer readable medium, which when executed, enables a computer system to deliver advertisements to user avatars in a virtual universe, the computer program product comprising:
    program code for introducing an advertisement avatar into the virtual universe;
    program code for targeting a user avatar for delivery of advertising content by the advertisement avatar, wherein the program code for targeting permits the user avatar to cancel the targeting of the user avatar with delivery of future advertising content in response to the user avatar expressing a desire that discourages further delivery of advertising content;
    program code for defining how the advertisement avatar is to move within the virtual universe;
    program code for defining how the advertisement avatar is to deliver the advertising content to the user avatar; and
    program code for introducing a plurality of advertisement avatars into the virtual universe to deliver advertising content to the user avatar in a coordinated manner, wherein use of the plurality of advertisement avatars to deliver advertising content to the user avatar is based on calculating a probability of success that the use of the plurality of advertisement avatars will have in generating a sale with the user avatar, wherein the calculating of the probability of success that the use of the plurality of advertisement avatars will have in generating a sale with the user avatar is based on matching preferences of the user avatar with a database of behaviors, wherein the coordinated manner causes the user avatar to be approached by the plurality of advertisement avatars in a synchronous manner or an asynchronous manner in response to determining that the probability of success is favorable, wherein in the synchronous manner the plurality of advertisement avatars approach the user avatar at the same time, while in the asynchronous manner the plurality of advertisement avatars approach the user avatar at different times, and wherein the synchronous manner is initiated upon failure of a previous advertisement avatar to obtain a sale and the asynchronous manner is initiated at scheduled visits.

12. The computer program product of claim 11, wherein the advertising content is delivered by the advertising avatar to the user avatar via a text or audio message.

13. The computer program product of claim 11, wherein the advertising content is delivered by the advertising avatar to the user avatar via an interactive question and answer session.

14. The computer program product of claim 11, wherein the user avatar is targeted based on demographic data of a user controlling the user avatar.

15. The computer program product of claim 11, wherein the user avatar is targeted based on a location of the user avatar in the virtual universe.

16. The computer program product of claim 11, wherein the user avatar is targeted based on an asset associated with the user avatar.

17. The computer program product of claim 11, wherein the user avatar is targeted based on an attendance of an event in the virtual universe.

18. The computer program product of claim 11, wherein a movement of the advertisement avatar is selected from the group consisting of: walking, running, teleporting, altering body language, following a user avatar, and leave a user avatar.

19. The computer program product of claim 11, further comprising program code for parsing actions of the user avatar, wherein the actions of the user avatar include postures and gestures.

20. A method, performed on a computer system, for delivering advertisements to user avatars in a virtual universe, the method comprising:
using the computer system to perform the following:
targeting a user avatar for delivery of advertising content by an advertisement avatar, wherein the targeting permits the user avatar to cancel the targeting of the user avatar with delivery of future advertising content in response to the user avatar expressing a desire that discourages further delivery of advertising content;
moving the advertisement avatar within the virtual universe proximate the user avatar;
delivering the advertising content to the user avatar; and
introducing a plurality of advertisement avatars into the virtual universe to deliver advertising content to the user avatar in a coordinated manner, wherein use of the plurality of advertisement avatars to deliver advertising content to the user avatar is based on calculating a probability of success that the use of the plurality of advertisement avatars will have in generating a sale with the user avatar, wherein the calculating of the probability of success that the use of the plurality of advertisement avatars will have in generating a sale with the user avatar is based on matching preferences of the user avatar with a database of behaviors, wherein the coordinated manner causes the user avatar to be approached by the plurality of advertisement avatars in a synchronous manner or an asynchronous manner in response to determining that the probability of success is favorable, wherein in the synchronous manner the plurality of advertisement avatars approach the user avatar at the same time, while in the asynchronous manner the plurality of advertisement avatars approach the user avatar at different times, and wherein the synchronous manner is initiated upon failure of a previous advertisement avatar to obtain a sale and the asynchronous manner is initiated at scheduled visits.

21. The method of claim 20, wherein the advertising content is delivered by the advertising avatar to the user avatar via a text or audio message.

22. The method of claim 20, wherein the advertising content is delivered by the advertising avatar to the user avatar via an interactive question and answer session.

23. The method of claim 20, wherein the user avatar is targeted based on demographic data of a user controlling the user avatar.

24. The method of claim 20, wherein the user avatar is targeted based on a location of the user avatar in the virtual universe.

25. The method of claim 20, wherein the user avatar is targeted based on an asset associated with the user avatar.

26. The method of claim 20, wherein the user avatar is targeted based on an occurrence of an event in the virtual universe.

27. The method of claim 20, wherein a movement of the advertisement avatar is selected from the group consisting of: walking, running, teleporting, altering body language, following a user avatar, and leave a user avatar.

28. The method of claim 20, further comprising parsing actions of the user avatar, wherein the actions of the user avatar include postures and gestures.

29. The method of claim 20, further comprising registering the advertisement avatar into the virtual universe.

30. A method for deploying an avatar advertising system that is performed on a computer system for delivering advertisements to user avatars in a virtual universe, the method comprising:
providing the computer system that is operable to:
target a user avatar for delivery of advertising content by an advertisement avatar, wherein the target of the user avatar for delivery of advertising content by the advertisement avatar permits the user avatar to cancel the targeting of the user avatar with delivery of future advertising content in response to the user avatar expressing a desire that discourages further delivery of advertising content;
define how the advertisement avatar is to move within the virtual universe;
define how the advertisement avatar is to deliver the advertising content to the user avatar; and
introduce a plurality of advertisement avatars into the virtual universe to deliver advertising content to the user avatar in a coordinated manner, wherein use of the plurality of advertisement avatars to deliver advertising content to the user avatar is based on calculating a probability of success that the use of the plurality of advertisement avatars will have in generating a sale with the user avatar, wherein the calculating of the probability of success that the use of the plurality of advertisement avatars will have in generating a sale with the user avatar is based on matching preferences of the user avatar with a database of behaviors, wherein the coordinated manner causes the user avatar to be approached by the plurality of advertisement avatars in a synchronous manner or an asynchronous manner in response to determining that the probability of success is favorable, wherein in the synchronous manner the plurality of advertisement avatars approach the user avatar at the same time, while in the asynchronous manner the plurality of advertisement avatars approach the user avatar at different times, and wherein the synchronous manner is initiated upon failure of a previous advertisement avatar to obtain a sale and the asynchronous manner is initiated at scheduled visits.

* * * * *